US00RE38023E

(19) United States
(12) Reissued Patent
De Laforcade

(10) Patent Number: US RE38,023 E
(45) Date of Reissued Patent: Mar. 11, 2003

(54) HEAD FOR DISPENSING A LIQUID PRODUCT IN THE FORM OF AN AEROSOL AND DISPENSER EQUIPPED WITH SUCH A HEAD

(75) Inventor: Vincent De Laforcade, Rambouillet (FR)

(73) Assignee: L'Oreal, Paris (FR)

( * ) Notice: This patent issued on a continued prosecution application filed under 37 CFR 1.53(d), and is subject to the twenty year patent term provisions of 35 U.S.C. 154(a)(2).

(21) Appl. No.: 09/236,650

(22) Filed: Jan. 26, 1999

Related U.S. Patent Documents

Reissue of:
(64) Patent No.: 5,785,250
Issued: Jul. 28, 1998
Appl. No.: 08/686,065
Filed: Jul. 24, 1996

(30) Foreign Application Priority Data

Jul. 24, 1995 (FR) ..... 95 08952

(51) Int. Cl.[7] ..... B05B 1/34; B05B 1/26; B05B 7/34

(52) U.S. Cl. ..... 239/337; 239/491; 239/543; 239/544; 239/545; 222/402.1

(58) Field of Search ..... 239/337, 543, 239/544, 545, 491; 222/402.1

(56) References Cited

U.S. PATENT DOCUMENTS 2,994,483 A * 8/1961 Christian ..... 239/543 X
3,045,925 A * 7/1962 Giangualano ..... 239/544 X
3,406,913 A * 10/1968 Frangos ..... 222/402.1 X
3,628,733 A * 12/1971 Kahn ..... 239/543 X
4,247,049 A * 1/1981 Galitis ..... 239/497
4,322,037 A * 3/1982 Heeb et al. ..... 239/337
4,568,002 A * 2/1986 Weinstein et al. .. 222/402.14 X
5,147,087 A * 9/1992 Fuchs ..... 239/337 X
5,211,317 A * 5/1993 Diamond et al. .... 222/402.1 X
5,337,926 A * 8/1994 Drobish et al. ..... 239/333 X
5,516,045 A * 5/1996 Baudin ..... 239/543 X
5,622,318 A * 4/1997 Bougamont et al. .... 239/333 X
5,735,465 A * 4/1998 Laforcade ..... 239/337
5,743,440 A * 4/1998 De Laforcade ..... 222/209
5,785,250 A * 7/1998 De Laforcade ..... 222/402.1
6,234,698 B1 * 5/2001 De Laforcade ..... 401/175

FOREIGN PATENT DOCUMENTS

FR 2691383 A1 * 5/1992
GB 1260616 * 1/1972
GB 2153444 A 8/1985
JP 60-124659 8/1985

OTHER PUBLICATIONS

Patent Abstracts of Japan; Publication No. 07275751 A, Oct. 24, 1995.
U.S. application No. 06/618,309, filed Mar. 18, 1996, Dockett No. 6388–088–3, pending.
U.S. appl;ication No. 08/623,784, filed Mar. 29, 1996, Docket No. 6388–090–3 pending.
U.S. application No. 08/650,714, filed May 20, 1996 Docket No. 6388–097–3 pending.
U.S. application No. 08/686,065, filed Jul. 24, 1996 Docket No. 6388–105–3 pending, Present application; listed for information.

* cited by examiner

*Primary Examiner*—Robin O. Evans
(74) *Attorney, Agent, or Firm*—Oblon, Spivak, McClelland, Maier & Neustadt, P.C.

(57) ABSTRACT

The invention relates to a head for dispensing a liquid product in the form of an aerosol. The dispensing head includes a push-button, at least two ducts housed in the push-button and at least two nozzles provided in the push-button. At least part of each duct is radial, and another part of the duct communicates with the nozzle and is orientated parallel to an axis of the nozzle. The nozzles are arranged so that the sprays leaving each nozzle strike each other in order to provide a single and homogeneous spray. The invention also relates to a dispenser equipped with such a dispensing head.

34 Claims, 4 Drawing Sheets

HEAD FOR DISPENSING A LIQUID PRODUCT IN THE FORM OF AN AEROSOL AND DISPENSER EQUIPPED WITH SUCH A HEAD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a head for dispensing a liquid product in the form of an aerosol and to a dispenser comprising a container for the product, equipped with this dispensing head. The dispenser may be used in the field of cosmetics for dispensing a hair lacquer, a deodorant, an anti-lice lotion, in the pharmaceutical field for dispensing insect repellents, and in the field of agriculture for dispensing insecticides.

The dispenser of the invention comprises, a product-dispensing head; and a container equipped with a dispensing valve fitted with a hollow control stem including a product inlet and product outlet; the dispensing head includes a push-button for actuating the valve via the stem, at least two nozzles housed in the push-button and at least two ducts respectively coupling each nozzle to the outlet of the stem.

2. Discussion of the Background

A related lacquer dispenser is described in FR-A-2,691,383. According to this document, the axes of the two nozzles are situated in one and the same plane and form with each other a narrow angle of from 1° to 40°. These nozzles are supplied with product via ducts whose axes are mutually parallel. This dispenser delivers a spray whose surface area of impact has a variable-density distribution of product, running the risk of altering the hair style. It does not allow the delivery of a homogeneous and gentle spray. Furthermore, this dispenser with a narrow angle between the two axes of the nozzles is difficult to produce because it requires the manufacture of highly inclined nozzles.

Also described in U.S. Pat. No. 3,045,925 is a dispenser of two products which are contained separately in two containers. Each product is atomized into the form of a spray and the two separate products are mixed by the collision of two sprays. This collision therefore generates a single spray. The atomization orifices are each connected by a straight duct to the outlet of the valve stem of the corresponding container. An atomizing head with such an arrangement of the two straight ducts is difficult to manufacture, especially in the mold-release phase of manufacture by molding.

Also, bearing in mind the poor mixing of the two products, the collision of the two sprays of different products does not give a single spray which is homogeneous in terms or product.

SUMMARY OF THE INVENTION

The present invention therefore aims to overcome the aforementioned drawbacks.

An object of the present invention is to provide for a dispensing head of the sort previously defined, which delivers a homogeneous spray.

Another object of the present invention is to provide for a dispensing head which delivers a gentle and non-diffused spray.

A further object of the present invention is to produce for a dispensing head which delivers a spray which has good properties regarding particle size of the product droplets and output rate.

Another object of the present invention is to provide for a dispensing head which is simple to manufacture.

The Applicant has unexpectedly and surprisingly discovered that such a result could be obtained by the collision of two or more sprays simultaneously leaving two or more nozzles, each nozzle being supplied by a duct having a special profile.

The dispensing head of the present invention may be used for dispensing hair lacquer, with the impact of the resulting spray on hair respecting the shape of the style.

The present invention therefore provides for a head for dispensing a liquid product in the form of an aerosol, including a push-button which has a longitudinal axis; at least two ducts housed in the push-button; and at least two nozzles provided in the push-button; wherein at least part of each duct is radial, and another part of the duct communicates with the nozzle and is orientated parallel to an axis of the nozzle so that the sprays leaving each nozzle strike each other in order to provide a single and homogeneous spray.

Another object of the invention is a dispenser including a pressurized container containing a liquid product to be dispensed in the form of an aerosol; a valve for dispensing this product, this valve being equipped with a hollow valve-control stem including an inlet and an outlet; and a dispensing head equipped with a push-button, with two ducts, and with two nozzles; wherein the dispensing heads is in accordance with the one defined earlier.

According to the invention, each duct couples each nozzle to the outlet of the valve stem.

Advantageously, the radial part is situated substantially in a plane transverse to the longitudinal axis of the push-button.

According to the invention, each duct may comprise an axial part having an axis parallel to the axis of the stem. One end of this part of the duct may be connected to the outlet of the hollow valve stem.

Preferably, the product dispensed by the dispensing head is a single product. A single product is understood to be a product which is packaged in a single container equipped with the atomization head according to the invention. In this case, the axial parts of the two ducts are coincident.

Advantageously, in order to make the manufacture of the dispensing head easier, each nozzle has an axis orientated transversely with respect to the longitudinal axis of the push-button, the axes of the nozzles being situated in one and the same plane.

Preferably, the axes of the nozzles form an angle ranging from 20° to 120°, and preferably an angle of 60°, with each other, in order to ensure the collision of the particles of the sprays.

The axis of each nozzle can be separated from the axis of the axial part of the duct by a distance at least equal to (i) the length of the pillar of the nozzle plus (ii) the width of the radial part of the duct. This separating distance makes molding and mold-release of the dispensing head easier, even for a small angle between the axes of the nozzles.

In a first alternate form, the radial part of each duct may connect the axial part to the other part of the duct communicating with the nozzle. It may be defined in one and the same piece or alternatively in two distinct pieces. In this case, the radial part of each duct may comprise a first element defined in the same piece as that of the axial part of the duct and a second element defined in another piece and carrying one of the nozzles, the two elements being joined together by a linking means.

Advantageously, the end of the radical part of each duct is perpendicular to the other part of the duct communicating with the nozzle. In a second alternative form, the axial part of the duct may be connected to the other part of the duct communicating with the nozzle by the radical part and by a curved, especially flexible part. In this case, each nozzle is advantageously held on the push-button by a post and a fastening bracket. Such an arrangement makes mold release of the dispensing head easier and gives this dispensing head a futuristic appearance.

As a preference, the dispensing head may include two nozzles which are advantageously identical.

Accordingly, the present invention relates to a dispensing head for dispensing a liquid product in the form of an aerosol. The dispensing head comprises a push-button having an axis; at least two ducts in the push-button; and at least two nozzles provided in the push-button. At least a part of each duct is radial and a further part of the duct communicates with the nozzle and is oriented parallel to a nozzle axis of the nozzle so that sprays leaving each nozzle strike each other is order to provide for a single and homogeneous spray.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
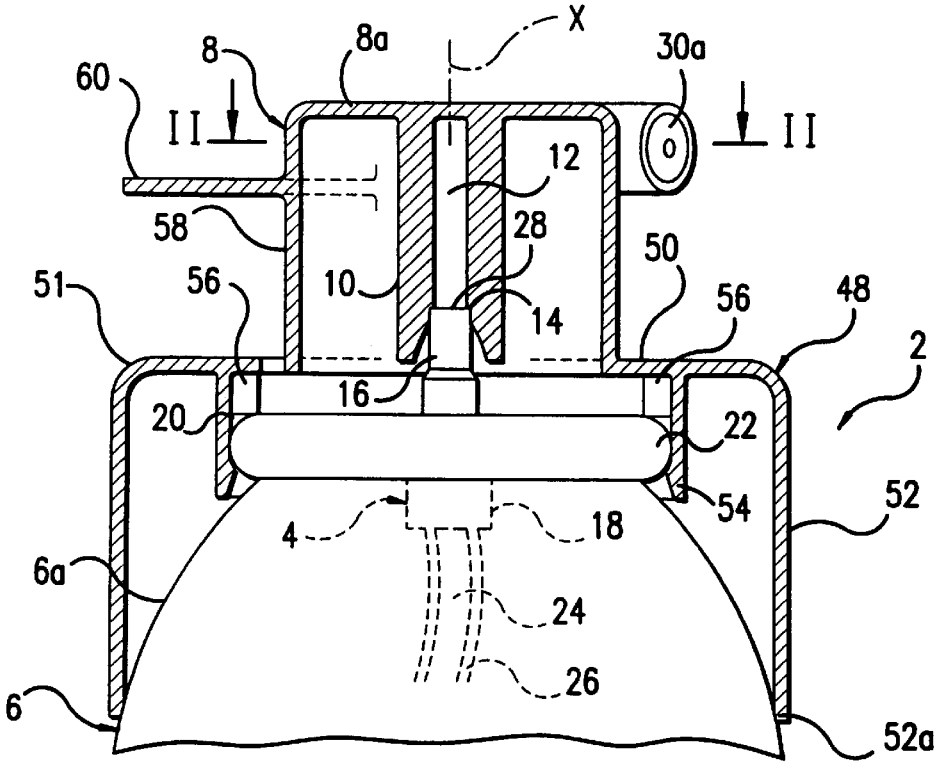
FIG. 1 is an axial section of a first alternative form of a dispenser in accordance with the present invention.
Figure 2:
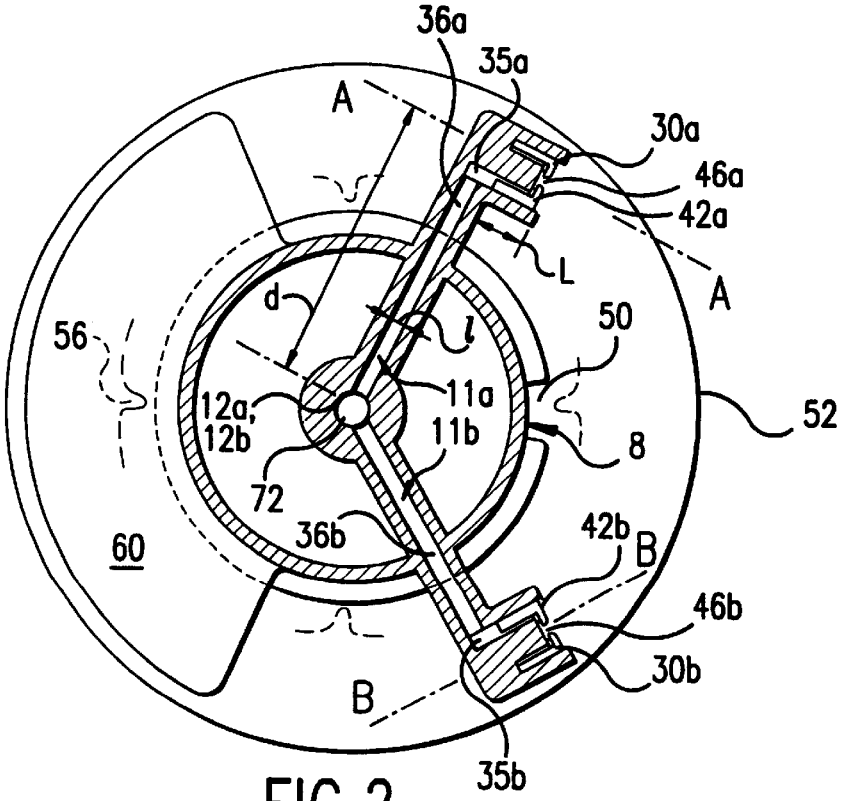
FIG. 2 is a section taken on the line II—II of FIG. 1.
Figure 3:
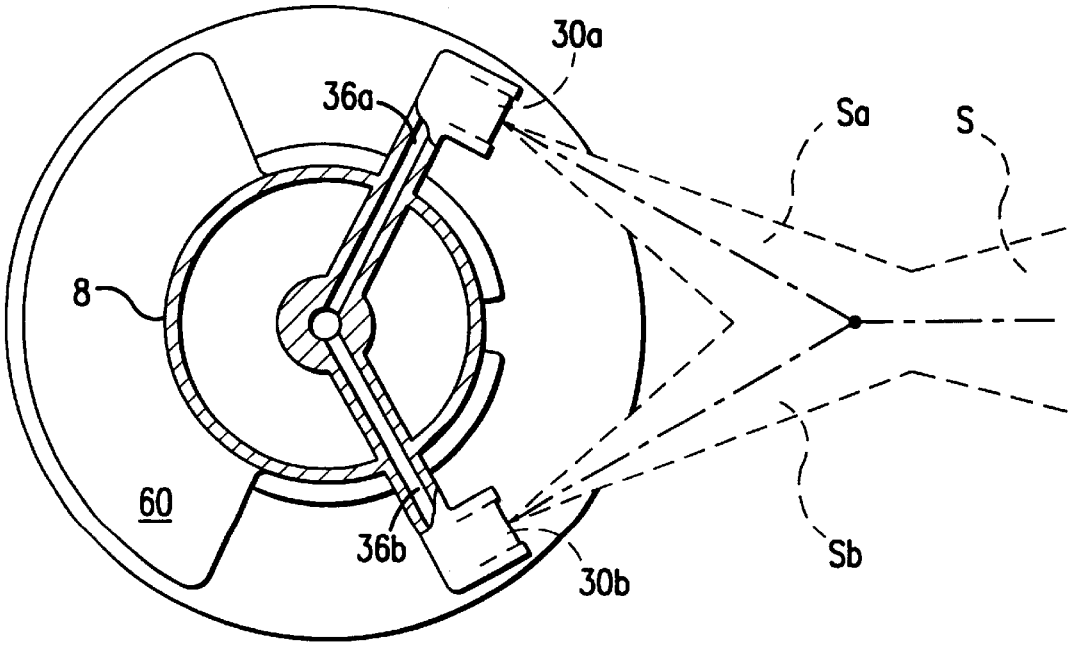
FIG. 3 is a diagram of the spray delivered by the dispenser of FIG. 1, in the same plane of section as that of FIG. 2.

Referring now to the drawings, wherein like reference numerals designate identical or corresponding parts throughout the several views, in FIGS. 1 to 3, it is possible to see a dispenser denoted overall by the reference numeral 2, having an axis X of symmetry and including a dispensing valve 4 equipping a container 6, generally cylindrical, pressurized with a propellent gas. The container 6 further contains a liquid product, for example a cosmetic product, to be dispensed in the form of an aerosol. This container 6 may be fitted with a pocket containing the product or with a piston, on either of which a propellant gas would act indirectly.

The dispenser 2 also comprises a push-button 8 fixed to the container 6 or to the top part of the valve 4. The push-button 8 includes, along the axis X, a cylindrical peg 10 integral with the top wall 8a of the push-button 8. An axial duct 12 passes through the peg 10.

The free end (on the container side) of the duct 12 has a bore 14 with a diameter larger than that of the duct 12, so as to form a housing to receive as a slight interference fit, the free end of a stem 16 for controlling the valve 4. The valve 4 is a conventional valve which is caused to open by depressing the stem 16 along the axis X when the push-button 8 is pressed. The axis X also constitutes the longitudinal axis of the stem 16.

The valve 4 has a body 18 which is crimped, at the top, on the control stem side, into a dished element 20 fixed by crimping or expansion rolling over a circular opening made at the top of a dome 6a of the container 6. This dished part has a rolled edge 22 and caps the top end of the dome 6a of the container 6. The lower part of the valve body 18, situated on the opposite side of the control stem 16 is equipped with a connecting region 24 extended by a dip tube 26 stretching as far as the bottom of the container 6.

The free end 28 of the stem 16 constitutes a product outlet of the stem 16; the other end of the stem 16 (not represented) situated in the valve body 18 constitutes the product inlet of the stem 16.

Figure 2A:
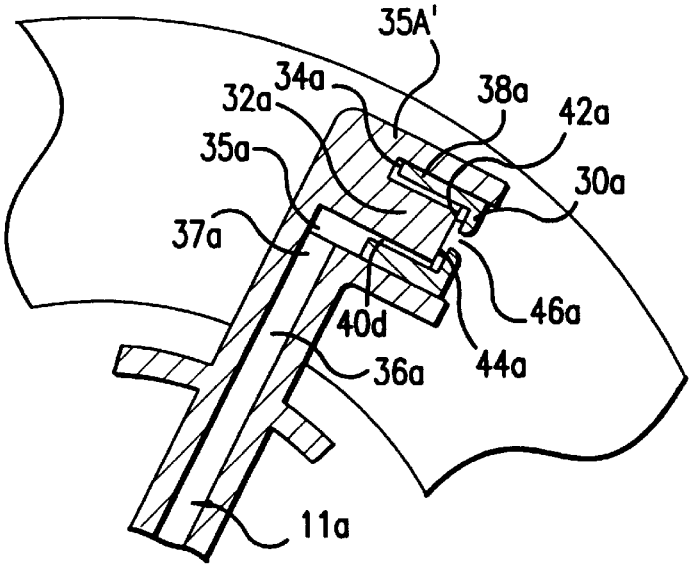
*FIG. 2a is a diagram detailing one of the nozzles shown in FIG. 2;*

As seen in FIGS. 2, 2a and 3, the push-button 8 includes, according to the invention, two atomization nozzles 30a, 30b and two ducts 11a, 11b. Each duct 11a, 11b respectively couples each nozzle 30a, 30b to the outlet 28 of the valve stem 16. Each nozzle 30a, 30b is a piece attached to the push-button 8 and, in a known fashion, includes swirl passages. Those parts of the dispenser which relate to the first nozzle 30a will have the suffix a and those parts which relate to the second nozzle 30b will have the suffix b.

Each duct 11a, 11b comprises an axial part, also known as an axial duct 12a, 12b, a radial part, also called a radial duct, 36a, 36b, and a part 35a, 35b communicating respectively with each nozzle 30a, 30b.

The push-button 8 further includes two pillars 32a, 32b of circular section, housed in sleeve tubes 35a', 35b' and defining with the latter an annular chamber 34a, 34b supplied respectively by the part 35a, 35b of the duct 11a, 11b. The straight part 35a, 35b of the duct is connected to the straight radial duct 36a, 36b communicating with the axial duct 12. The pillars 32a, 32b have axes of symmetry A—A, B—B which are perpendicular to the axis X. Each pillar 32a, 32b has a front face 44a, 44b. Each part 35a, 35b of each duct 11a, 11b emerges in the annular chamber 34a, 34b of the nozzles 30a, 30b and is parallel to the axis A—A, B—B of the nozzle 30a, 30b.

The nozzles 30a, 30b respectively include a peripheral skirt 38a, 38b which is inserted into the annular chamber 34a, 34b against the internal wall 40a, 40b of the sleeve tubes 35a, 35b. Each nozzle 30a, 30b further includes a rear face 42a, 42b parallel to the front face 44a, 44b of the pillars 32a, 32b which presses against it.

In order to atomize product through the nozzles 30a, 30b, these respectively have an orifice 46a, 46b along the axes A—A and B—B.

The axes A—A, B—B of the nozzles 30a, 30b are situated in one and the same plane perpendicular to the axis X. In FIG. 2, the axes A—A and B—B form an angle of 60° with each other.

As seen in FIG. 2, the axis A—A, B—B of the nozzle 30a, 30b is separated from the axis X of the central duct 12 by a distance d which is at least equal to the length L of the pillar 32a, 32b plus the width l of the radial duct 36a, 36b ($d \geqq L+l$).

The push-button 8 is linked to a fixing ring 48 by a film hinge 50. The fixing ring 48 includes a plateau 51, an external skirt 52, the lower end 52a of which is in contact with the wall of the container 6 and an internal skirt 54 which is snap-fitted over the annular edge 22 of the dished element 20 of the container 6. Reliefs 56 connected to the internal skirt 54 and in contact with the annular edge 22 of the dished element 20 ensure good stability of the fixing ring 48 on the container 6.

The push-button includes a skirt 58 which is substantially cylindrical about the axis X, equipped with a tongue 60 for controlling the dispenser which stretches in a plane substantially transverse to the axis X.

When a thrust is applied to the tongue 60 of the push-button 8, the product contained in the container 6 is atomized to the outside via the duct 12, the radial ducts 36a, 36b and the orifices 46a, 46b of the nozzles 30a, 30b under the action of the propellant gas.

As shown in FIG. 3, the two sprays $S_a$, $S_b$ leaving the two nozzles meet at a point of convergence P then form a single divergent spray S. The collision of the particles of the sprays $S_a$, $S_b$ causes a reduction in their kinetic energy generating a spray S with a force of impact which is smaller than that of the sprays $S_a$ and $S_b$; the spray S is therefore gentle. The spray S has a transverse section which is slightly oval and has an almost homogeneous product density. Its appearance is identical to that of the single-nozzle sprays of the prior art. The output rate of the spray S is slightly greater than that of a spray obtained with a single nozzle, which makes it possible to hold the hairstyle firmly in place when the dispenser is used for applying hair lacquer.

Figure 4:
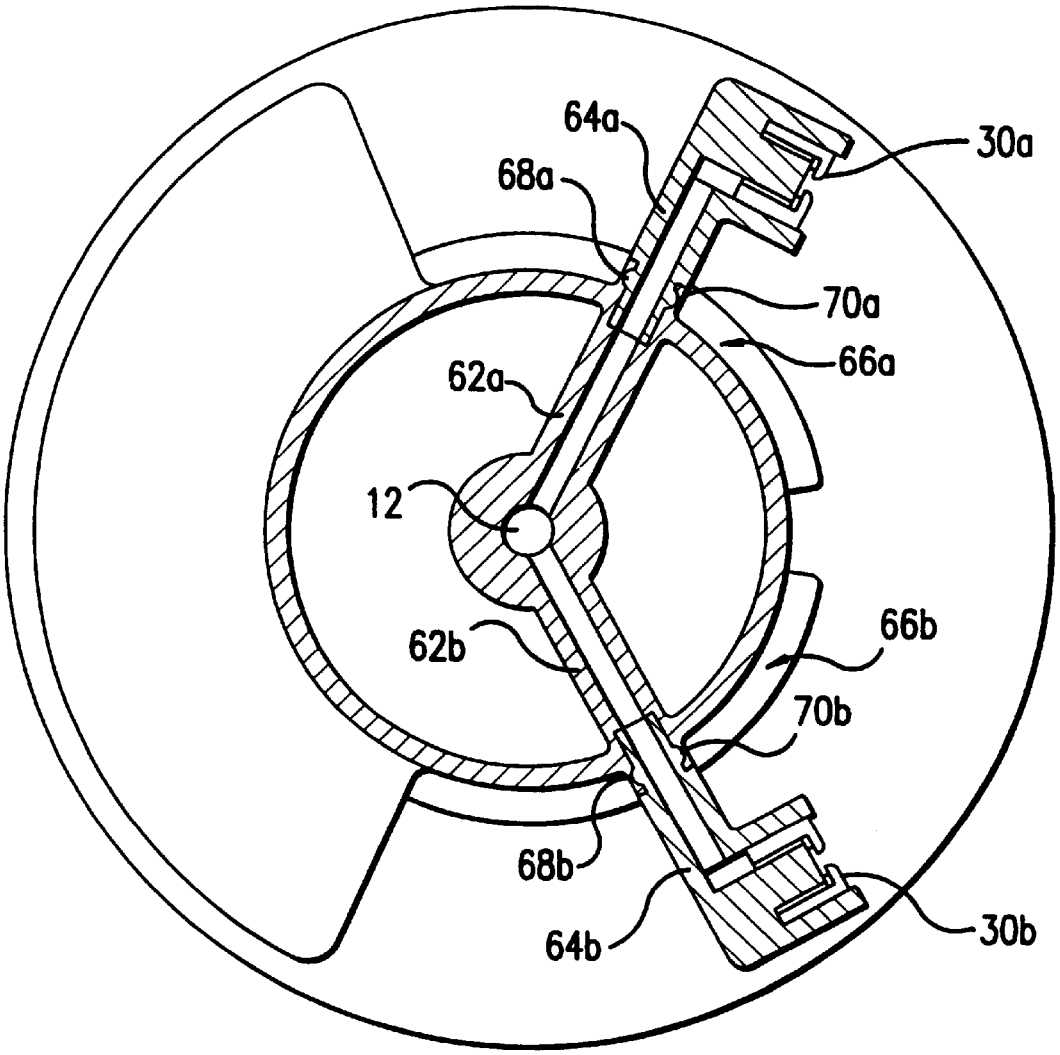
FIG. 4 is a section, similar to FIG. 2, of a second alternative form of a dispenser in accordance with the present invention.

In FIG. 4 elements which are identical to, or fulfill roles similar to, elements already described are denoted by the same numerical references. They will not be described again or will be described again only briefly.

FIG. 4 shows a dispenser which can be distinguished from the one in FIG. 2 by the fact that the radial ducts 36a, 36b include two elements 62a, 64a, 62b, 64b joined together by a linking means 66a, 66b. The first element 62a, 62b is defined in the same piece as that of the central duct 12. The second element 64a, 64b carries the nozzle 30a, 30b. The linking means 66a, 66b includes a sealing ring 68a, 68b carried by the second element 64a, 64b and a channel 70a, 70b situated on the inside of the first element 62a, 62b, the ring 68a, 68b being snapped into the channel 70a, 70b. This arrangement makes mold release of the pieces of the push-button easier.

Figure 5:
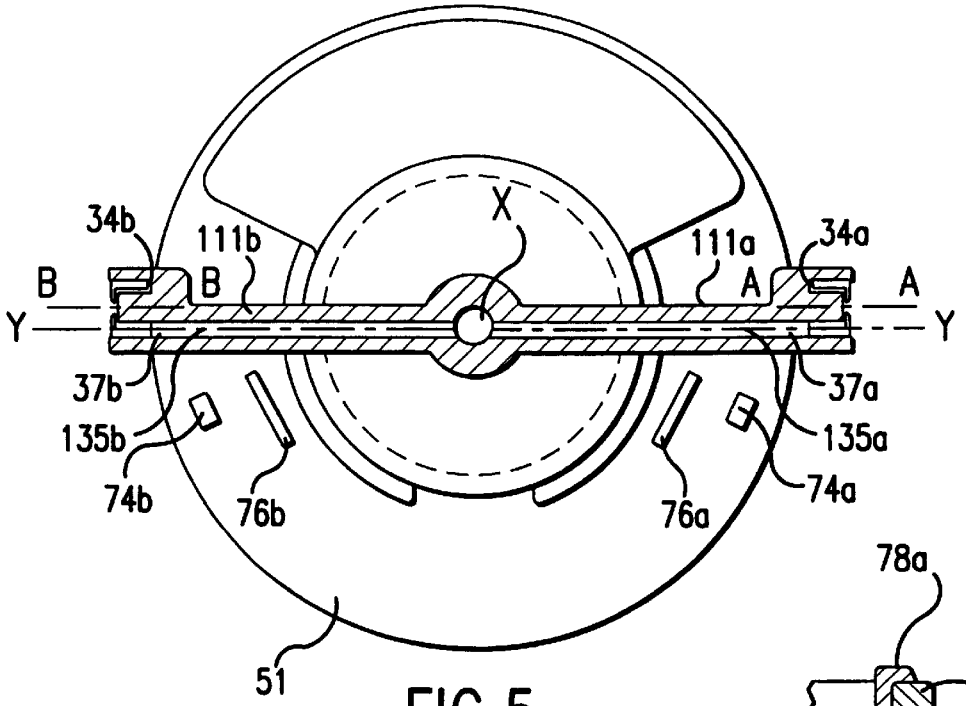
FIG. 5 is a view in section, similar to FIG. 1, of a third alternative form of a dispenser in accordance with the present invention, before the nozzles have been held in place.
Figure 7:
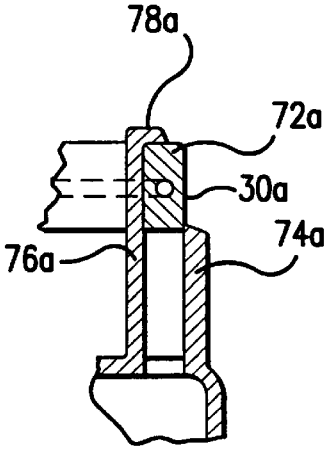
FIG. 7 is a part section, taken on the line VII—VII of FIG. 6.
Figure 6:
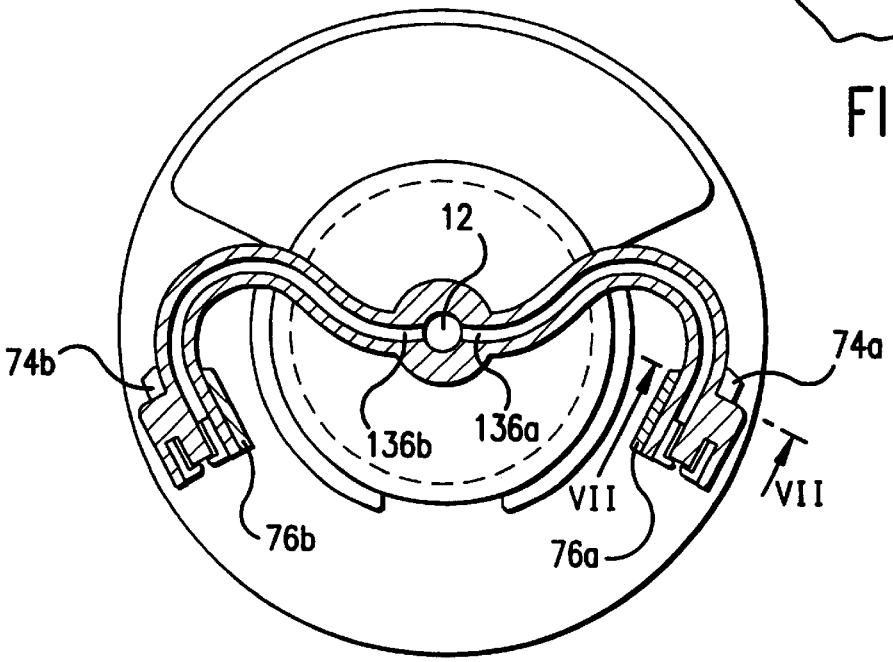
FIG. 6 is a section, similar to FIG. 2, of the dispenser of FIG. 5, after the nozzles have been mounted in place.

Referring to FIGS. 5 to 7, there can be seen another alternative form of the dispenser according to the invention. As before, the elements which differ from those of FIG. 1 will carry references increased by 100. The differences essentially relate to the shape of the ducts.

FIG. 5 shows, before mounting of the nozzles in place, a push-button in which the ducts 111a, 111b are aligned along an axis Y orthogonal to the axis X and parallel to the parts 135a, 135b of the duct. The ends 37a, 37b of these radical ducts 111a, 111b are substantially parallel to the respective axis A—A, B—B of the associated nozzle 30a, 30b. Such an arrangement makes it possible to produce the push-button by molding as a single piece, and especially the radial ducts, the sleeve tubes and the pillars.

In this embodiment, the plateau 51 of the fixing ring 48 includes posts 74a, 74b and fastening brackets 76a, 76b, the height of which stretches in a direction substantially parallel to the axis X. These posts and brackets constitute a means for attaching the nozzles so as to orientate them in a configuration which makes it possible to obtain the desired result for the atomized product.

As illustrated in FIG. 6, the duct 111a, 111b is defined in a flexible piece and is deformed by placing each nozzle 30a, 30b in the space situated between the post 74a, 74b and the fastening bracket 76a, 76b. The duct 111a, 111b has a radical part 136a, 136b which emerges in the axial duct 12. Although not represented in the Figures, it is preferable for the wall of each duct 111a, 111b not to have a constant thickness over one same section, so as to allow good deformation of the duct.

FIG. 7 shows the way in which the nozzle 30a is held by the post 74a and the fastening bracket 76a. The bracket 76a has a protruding portion 78a perpendicular to the axis of the bracket and allows the nozzle 30a to be held in position. The piece defining the radical ducts finds itself blocked between the post and the bracket at each of its ends.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A dispensing head for dispensing a liquid product in the form of an aerosol, the dispensing head comprising:

a push-button having an axis;

at least two ducts in the push-button; and at least two nozzles provided in the push-button, *said nozzles having nozzle axes oriented so as to direct sprays leaving each nozzle in a plane substantially perpendicular to the axis of the push button*;

wherein at least part of each duct is radial and a further part of the duct communicates with [the] *a respective* nozzle and is oriented parallel to [a] *the* nozzle axis of the nozzle so that sprays leaving each nozzle strike each other to provide a single and homogeneous spray.

2. A dispensing head according to claim 1, wherein each duct comprises at least one axial part.

3. A dispensing head according to claim 1, wherein the product is dispensed is a single product.

4. A dispensing head according to claim 1, wherein the nozzle axis of each nozzle is oriented substantially transversely with respect to the axis of the push-button which is a longitudinal axis, the nozzle axes of the nozzles being situated in one and the same plane.

5. A dispensing head according to claim 1, wherein the nozzle axes of the nozzles form an angle ranging from 20° to 120° with each other.

6. A dispensing head according to claim 2, wherein the nozzle axis of each nozzle is separated from an axis of the axial part of the duct by a distance which is at least equal to a length of a pillar of the nozzle plus a width of the radial part of the duct.

7. A dispensing head according to claim 1, wherein the radial part of each duct is situated in a plane transverse to the longitudinal axis of the push-button.

8. A dispensing head according to claim 2, wherein the radial part of the duct connects the axial part to the further part of the duct communicating with the nozzle.

9. A dispensing head according to claim 1, wherein the duct further comprises a curved part.

10. A dispensing head according to claim 2, wherein the radial part of each duct comprises a first element defined in a same piece as that of the axial part of the duct and a second element carrying one of the nozzles and defined in another piece, the two elements being joined together by a linking means.

11. A dispensing head according to claim 1, wherein each nozzle is held by a post and a fastening bracket which are fixed to the push-button.

12. A dispensing head according to claim 1, wherein the radial part of each duct is perpendicular to the further part of the duct communicating with the nozzle.

13. A dispensing head according to claim 1, wherein the dispensing head includes two nozzles.

14. A dispensing head according to claim 1, wherein the nozzles are identical.

15. A dispenser according to claim 1, further comprising a pressurized container which contains the liquid product to be dispensed in the form of an aerosol; a valve for dispensing the product, the valve being equipped with a hollow valve-control stem including an inlet and an outlet; and a dispensing head equipped with the push-button which includes the at least two ducts, and the at least two nozzles.

16. A dispensing head for dispensing a liquid product in the form of an aerosol, the dispensing head comprising:

a push-button member having a longitudinal axis extending therethrough;

at least two duct members located in the push-button member; and at least two nozzle members extending from said at least two duct members, *said nozzle members having nozzle axes oriented so as to direct sprays leaving each nozzle member in a plane substantially perpendicular to the axis of the push button*;

wherein each of said at least two duct members comprises a radial first portion and a second portion which communicates with [said] *a respective* nozzle member, the second portion of each duct member being oriented parallel to [a] *the* nozzle axis of the corresponding nozzle *member*, such that sprays from each of said [nozzles] *nozzle members* strike each other to provide for a single homogeneous spray.

17. A dispensing head for dispensing a liquid product in the form of an aerosol, the dispensing head comprising:

a push-button having an axis including a cylindrical skirt;

at least two ducts in the push-button extending from inside said skirt to outside said skirt *to outside said skirt*; and at least two nozzles provided in the push-button outside said skirt, *said nozzles having nozzle axes oriented so as to direct sprays leaving each nozzle in a plane substantially perpendicular to the axis of the push button*;

wherein:

at least part of each duct is radial and a further part of the duct communicates with the *respective* nozzle and is oriented parallel to [a] *the* nozzle axis of the nozzle so that *the* sprays leaving each nozzle strike each other to provide a single and homogeneous spray.

*18. The dispensing head of claim 1, further comprising a tongue extending laterally from said push button at a position diametrically opposite a region of intersection of said sprays.*

*19. The dispensing head of claim 1, wherein said ducts are not colinear.*

*20. The dispensing head of claim 1, wherein each of said nozzles is a swirl nozzle.*

*21. The dispensing head of claim 16, further comprising a tongue extending laterally from said push button at a position diametrically opposite a region of intersection of said sprays.*

*22. The dispensing head of claim 16, wherein said ducts are not colinear.*

*23. The dispensing head of claim 16, wherein each of said nozzles is a swirl nozzle.*

*24. The dispensing head of claim 17, further comprising a tongue extending laterally from said push button at a position diametrically opposite a region of intersection of said sprays.*

*25. The dispensing head of claim 17, wherein said ducts are not colinear.*

*26. The dispensing head of claim 17, wherein each of said nozzles is a swirl nozzle.*

*27. A dispensing head for dispensing a liquid product in the form of an aerosol, the dispensing head comprising:*

*a push-button having an axis;*

*at least two ducts in the push-button; and*

*at least two nozzles provided in the push-button, said nozzles having nozzle axes oriented so as to direct sprays leaving each nozzle in a plane which does not contain the axis of the push button;*

*wherein at least part of each duct is radial and a further part of the duct communicates with a respective nozzle and is oriented parallel to the nozzle axis of the nozzle so that the sprays leaving each nozzle strike each other to provide a single and homogeneous spray.*

*28. A dispensing head for dispensing a liquid product in the form of an aerosol, the dispensing head comprising:*

*a push-button member having a longitudinal axis extending therethrough;*

*at least two duct members located in the push-button member; and*

*at least two nozzle members extending from said at least two duct members, said nozzle members having nozzle axes oriented so as to direct sprays leaving each nozzle member in a plane which does not contain the axis of the push button;*

*wherein each of said at least two duct members comprises a radial first portion and a second portion which communicates with a respective nozzle member, the second portion of each duct member being oriented parallel to the nozzle axis of the corresponding nozzle member, such that the sprays from each of said nozzle members strike each other to provide for a single homogeneous spray.*

*29. A dispensing head for dispensing a liquid product in the form of an aerosol, the dispensing head comprising:*

*a push-button having an axis including a cylindrical skirt;*

*at least two ducts in the push-button extending from inside said skirt; and*

*at least two nozzles provided in the push-button outside said skirt, said nozzles having nozzle axes oriented so as to direct sprays leaving each nozzle in a plane which does not contain the axis of the push button;*

*wherein at least part of each duct is radial and a further part of the duct communicates with the respective nozzle and is oriented parallel to the nozzle axis of the nozzle so that the sprays leaving each nozzle strike each other to provide a single and homogeneous spray.*

*30. A dispensing head for dispensing a liquid product in the form of an aerosol, the dispensing head comprising a push-button having an axis and at least two ducts, the push-button further comprising at least two nozzles in communication with a respective duct, said nozzles having nozzle axes oriented so as to direct sprays leaving each nozzle in a plane which does not contain the axis of the push button, said nozzles being oriented with respect to each other so that the sprays leaving each nozzle strike each other to provide a single and homogeneous spray.*

*31. A dispensing head according to claim 27, wherein each of said nozzles is a swirl nozzle.*

*32. A dispensing head according to claim 28, wherein each of said nozzle members is a swirl nozzle.*

*33. A dispensing head according to claim 29, wherein each of said nozzles is a swirl nozzle.*

*34. A dispensing head according to claim 30, wherein each of said nozzles is a swirl nozzle.*

* * * * *

UNITED STATES PATENT AND TRADEMARK OFFICE

CERTIFICATE OF CORRECTION

PATENT NO. : RE 38,023 E
DATED : March 11, 2003
INVENTOR(S) : Vincent De Laforcade It is certified that error appears in the above-identified patent and that said Letters Patent is hereby corrected as shown below:

Column 6,
Line 29, change “product is dispensed” to -- product dispensed --.

Column 7,
Lines 29-30, delete italicized “to outside said skirt”.

Signed and Sealed this

Thirteenth Day of May, 2003

JAMES E. ROGAN
*Director of the United States Patent and Trademark Office*